(12) United States Patent
Colle et al.

(10) Patent No.: US 12,731,983 B2
(45) Date of Patent: Sep. 8, 2026

(54) SUPERCONDUCTOR CURRENT LIMITING DEVICE AND AIRCRAFT COMPRISING SUCH A DEVICE

(71) Applicant: Airbus SAS, Blagnac (FR)

(72) Inventors: Alexandre Colle, Blagnac (FR); Reda Abdouh, Blagnac (FR)

(73) Assignee: Airbus SAS, Blagnac (FR)

( * ) Notice: Subject to any disclaimer, the term of this patent is extended or adjusted under 35 U.S.C. 154(b) by 188 days.

(21) Appl. No.: 18/586,658

(22) Filed: Feb. 26, 2024

(65) Prior Publication Data

US 2024/0291270 A1 Aug. 29, 2024

(30) Foreign Application Priority Data

Feb. 28, 2023 (FR) ...................................... 2301840

(51) Int. Cl.

*H02H 9/02* (2006.01)
*B64D 47/00* (2006.01)
*H01F 6/00* (2006.01)

(52) U.S. Cl.

CPC ............. *H02H 9/023* (2013.01); *B64D 47/00* (2013.01); *H01F 2006/001* (2013.01)

(58) Field of Classification Search

CPC .......... H02H 9/02; H02H 9/023; B64D 47/00; H01F 6/00; H01F 2006/001; H10N 60/30; H01B 12/04

USPC ........................................................... 361/19

See application file for complete search history.

(56) References Cited

U.S. PATENT DOCUMENTS

| | | | | |
|---|---|---|---|---|
| 5,250,508 A * | 10/1993 | Pham | H02H 9/023 505/211 |
| 5,450,266 A * | 9/1995 | Downie | H02H 9/023 361/19 |
| 6,043,731 A | 3/2000 | Mcdougall et al. | |
| 2006/0122067 A1* | 6/2006 | Holcomb | H10N 60/30 505/124 |
| 2008/0192392 A1* | 8/2008 | Folts | H01B 12/02 361/19 |
| 2011/0312498 A1* | 12/2011 | Tekletsadik | H02H 9/023 505/150 |
| 2013/0225414 A1* | 8/2013 | Amato | H02H 9/08 361/19 |
| 2014/0087950 A1* | 3/2014 | Isojima | H01F 6/02 505/163 |

OTHER PUBLICATIONS

French Search Report for corresponding French Patent Application No. 2301840 dated Oct. 6, 2023.

M. Búran et al., "Impact of a REBCO Coated Conductor Stabilization Layer on the Fault Current Limiting Functionality" Superconductor Science and Technology, IOP Publishing, Techno House, Bristol, GB, vol. 32, No. 9, Jul. 30, 2019; 95008.

* cited by examiner

*Primary Examiner* — Danny Nguyen

(74) *Attorney, Agent, or Firm* — Greer, Burns & Crain, Ltd.

(57) ABSTRACT

A superconductor current limiting device comprising a leak-tight enclosure having two apertures arranged to allow a circulation of a cryogenic fluid, a superconductor busbar, and an inductor comprising two poles arranged inside the leak-tight enclosure and disposed facing a central part of the superconductor busbar. Each of the two poles of the inductor is electrically connected to a terminal part of the superconductor busbar via a connection link to one of the two poles.

7 Claims, 2 Drawing Sheets

SUPERCONDUCTOR CURRENT LIMITING DEVICE AND AIRCRAFT COMPRISING SUCH A DEVICE

CROSS-REFERENCES TO RELATED APPLICATIONS

This application claims the benefit of French Patent Application Number 2301840 filed on Feb. 28, 2023, the entire disclosure of which is incorporated herein by way of reference.

FIELD OF THE INVENTION

The present invention relates to a current limiting device intended to apply a current limitation in the presence of a fault in an electrical circuit. The invention relates more particularly to a superconductor current limiting device. At least one embodiment relates to such a device configured for use onboard an aircraft.

BACKGROUND OF THE INVENTION

There are many devices for limiting an electrical current in existence and their structures vary according to the context of use. Two limiting device architectures are frequently used. One is based on a resistive structure, such that the resistance of a material used increases with a current that increases in the presence of a fault, which produces an effect contrary to the limitation of the current in the material. The other, resembling a transformer, is based on an inductive structure in which, in the presence of a fault, the magnetic flux of the short-circuited secondary coil no longer opposes the magnetic flux of the primary coil connected to the power supply line and the latter sees its impedance increase, which then limits the current. Many applications in which strong electrical currents circulate use what are commonly called busbars, acting as electrical current guide conductors. These busbars are generally made of copper or of aluminium. Busbars cooled by a cryogenic fluid are used in cryogenic systems configured to substantially reduce the losses by Joules effect, optimize the efficiency of electrical systems, and increase the ratio between the weight of the equipment used and the electrical power available in and for equipment items. In the case of a superconductor busbar cooled by a cryogenic fluid, a limitation of a fault current can be introduced and the situation can be improved.

SUMMARY OF THE INVENTION

One object of the present invention is to propose a superconductor current limiting device that makes it possible both to supply strong currents in the absence of a fault and to effectively limit a fault current in the presence of a fault in a power electrical circuit cooled by a cryogenic fluid.

To this end, a superconductor current limiting device is proposed that comprises a leak-tight enclosure having two apertures arranged to allow a circulation of a cryogenic fluid inside said leak-tight enclosure. The superconductor current limiting device further comprises a superconductor busbar passing through the leak-tight enclosure via two connection apertures, of which a so-called "central" part is arranged inside the leak-tight enclosure and of which two so-called "terminal" parts are respectively arranged on either side of the central part and in the continuity of the central part and are at least partially arranged outside the leak-tight enclosure, the superconductor current limiting device being configured such that:

- an inductor comprising two poles is arranged inside the leak-tight enclosure and is disposed facing the central part of the superconductor busbar, and,
- each of the two poles of the inductor is electrically connected to one of the terminal parts of the superconductor busbar via a connection link.

Advantageously, the superconductor current limiting device operates as an effective cryogenic current conductor in the absence of a fault, and as an effective current limiter in the presence of a fault, through the combined effect of the inductance and of the resistance specific to the superconductor busbar.

The superconductor current limiting device according to the invention can further comprise the following features, considered alone or in combination:

- The superconductor busbar comprises superconductive strips without a stabilizing layer.
- The superconductor busbar comprises a ceramic superconductive material.
- The inductor comprises a fault current detection device.

Also a subject of the invention is an aircraft comprising at least one superconductor current limiting device as previously described.

BRIEF DESCRIPTION OF THE DRAWINGS

The features of the invention mentioned above, and others, will become more clearly apparent on reading the following description of an exemplary embodiment, said description being given in relation to the attached drawings.

DETAILED DESCRIPTION OF THE PREFERRED EMBODIMENTS

Figure 3:
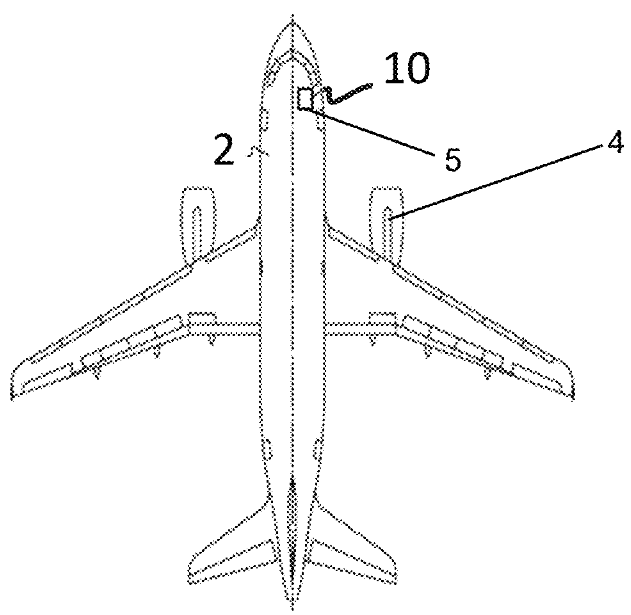

In relation to FIG. 3, an aircraft 2 comprises at least one electric motor 4 powered using a cryogenic system 5 for producing and supplying electrical energy to an electric motor. The cryogenic system 5 for producing and supplying electrical energy to the at least one electric motor 4 comprises at least one superconductor current limiting device 10.

Figure 1:
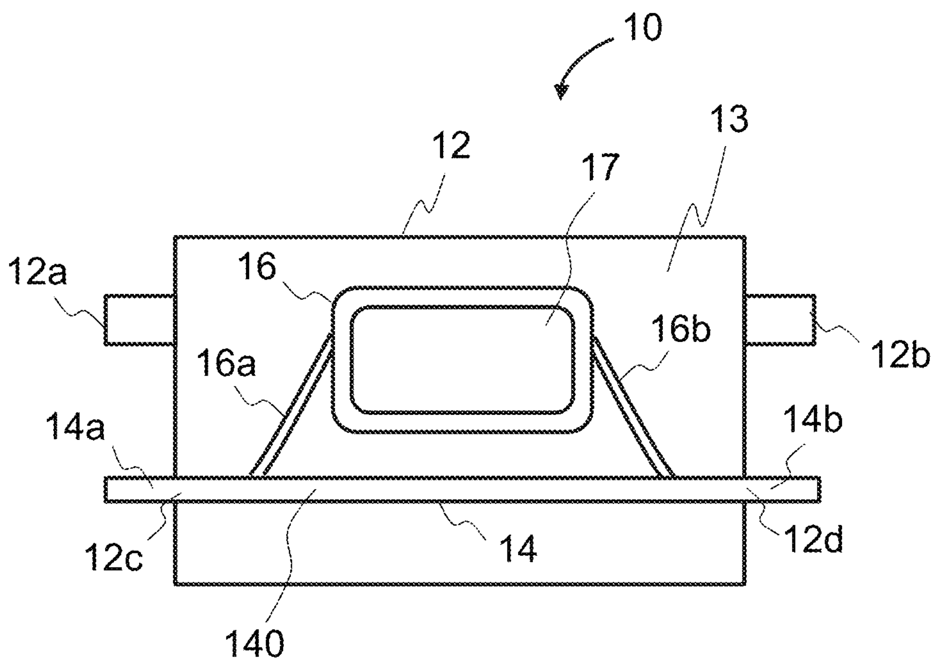
FIG. 1 schematically illustrates a superconductor current limiting device according to an embodiment.

Referring to FIG. 1, the superconductor current limiting device 10 is a cryogenic device inasmuch as it uses a cryogenic fluid to reduce the resistivity of at least one material used to conduct the electricity in the absence of a fault. With the resistivity being reduced because of the cryogenic temperatures, the losses by Joules effect are very low for conductive materials such as copper, and are nonexistent, in direct current, for the superconductive materials. The superconductor current limiting device 10 comprises a leak-tight enclosure 12 in which a cryogenic fluid 13 circulates. The circulation of the cryogenic fluid 13 takes place between two apertures 12*a* and 12*b* of the leak-tight enclosure 12. For example, the cryogenic fluid 13 is introduced into the leak-tight enclosure 12 through the aperture 12*a* used as an input aperture and the cryogenic fluid 13 is then extracted from the leak-tight enclosure 12 through the aperture 12*b* used as an output aperture. The circulation of the cryogenic fluid 13 through the leak-tight enclosure 12 can be produced using an external pump, not represented in FIG. 1. Advantageously, and in order to reduce the losses by Joules effect, a superconductor busbar 140 comprising a central part 14 and terminal parts 14*a* and 14*b* passes through the leak-tight enclosure 12 such that its central part 14 is surrounded by the cryogenic fluid 13 circulating in the leak-tight enclosure 12. Thus, the resistivity of the superconductor busbar 140 is reduced thereby, and, consequently, its resistance is also reduced, by virtue of a phenomenon of superconductivity, which leads to a significant reduction of the losses by Joules effect. The terminal parts 14*a* and 14*b* are used for the electrical connection of the superconductor busbar 140 and have cooling means external to the leak-tight enclosure 12. These cooling means are not described here because they are not useful to an understanding of the invention that is the subject of the present document. According to one embodiment, all of the circuits for producing and transporting electrical energy used in the system which comprises the superconductor current limiter 10 use the properties of the cryogenic temperatures to optimize the efficiency and the ratio between the weight and power of the equipment items in operation.

Apertures 12*c* and 12*d* advantageously allow the leak-tight enclosure 12 to be passed through by the terminal parts 14*a* and 14*b* of the superconductor busbar 140. The superconductor busbar 140, composed of the terminal parts 14*a*, 14*b* arranged on either side of the central part 14, as well as the latter, provides "current conductor" or even "current guide" functions.

According to one embodiment, the superconductor busbar 140 comprises superconductive strips without a stabilizing layer in order to reduce the volume and the weight of the device which then becomes more resistive and therefore more effective in the case of a fault.

According to another embodiment, the superconductor busbar 140 is produced in a superconductive ceramic material, or comprises such a material, so as to reduce the volume and the weight of the device which then becomes more resistive and therefore more effective in the case of a fault.

In one embodiment, the terminal parts 14*a* and 14*b* are produced with conductive materials, for example of copper type, that differ from those of the central part 14.

Shrewdly, an inductor 16 implemented in the form of a winding (also usually called coil) is connected to (between) the terminal parts of the superconductor busbar 140 composed of the central part 14, and the two terminal parts 14*a* and 14*b*. The inductor 16 has two poles 16*a* and 16*b* respectively linked to the terminal parts 14*a* and 14*b* of the superconductor busbar 140. Thus, in the presence of a current of an intensity greater than or equal to a predetermined threshold value and defined as a fault current, the superconductor busbar 140 heats up above what is planned for in normal conditions of use and its resistivity increases, consequently making its resistance and its impedance increase, such that the impedance of the inductor 16 becomes lower than the impedance of the central part 14 of the superconductor busbar 140. These variations cause an increasing portion of the electrical current passing through the superconductor current limiting device 10 to then transit through the inductor 16. When an increasing current transits via the inductor 16, an increasing magnetic field increases the resistivity of the central part of the superconductor busbar 140, and therefore increases its impedance, which further increases the phenomenon of diversion of the current passing through the superconductor current limiting device 10 via the inductor 16, the inductance of which also increases. Thus, the limitation of the fault current is mostly applied by the inductor 16 rather than by the resistance specific to the superconductor busbar 140.

More shrewdly, a fault current detection device 17 is coupled to the inductor 16 or is included in the inductor 16. The fault current detection device 17 is configured to measure the current component which passes through the inductor 16 and to supply information representative of this component to a remote supervisory equipment item. The remote supervisory equipment item can then activate a safety system suitable for activating one or more safety circuits useful to the preservation of the electrical systems and circuits directly or indirectly affected by the electrical fault that is present.

Figure 2:
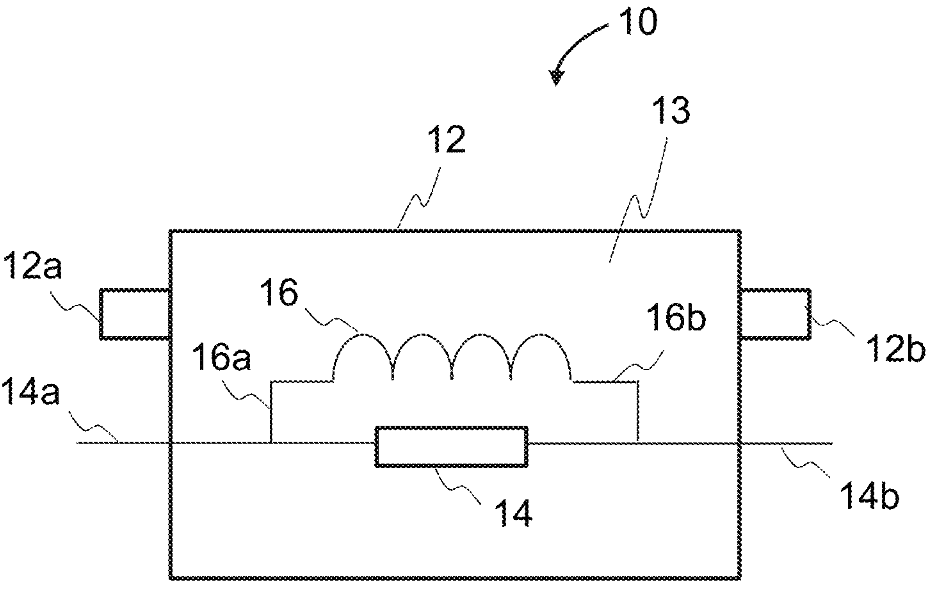
FIG. 2 schematically and symbolically illustrates the superconductor current limiting device already represented in FIG. 1; and, FIG. 3 describes an aircraft comprising a current limiting device as already illustrated in FIG. 1 and in FIG. 2.

Another illustration of the superconductor current limiting device 10 appears in FIG. 2 which employs standard electrical, electrotechnical or electronic diagrammatic symbols. In this FIG. 2 the central part of the superconductor busbar 140 appears as a resistive component of the overall impedance of the superconductor current limiting device 10 and the inductor 16 appears as an inductive component of this overall impedance. Shrewdly, and because of the cryogenic and superconductive nature of the superconductor current limiting device 10, the variation of the inductive part of the overall impedance acts positively on the variation of the resistive part of the overall impedance, which contributes to a rapid and effective limitation of the fault current when a fault occurs downstream of the superconductor current limiting device 10 in the electrical circuit containing the superconductor current limiting device 10.

Additionally, the central part 14 of the superconductor busbar 140 and the inductor 16 are arranged in parallel within the leak-tight enclosure 12. Further, the superconductor busbar 140 is linear and extends through opposite sides of the leak-tight enclosure 12.

According to an exemplary embodiment, for an electric motor having a rated current of 1400 A, a back-electromotive force of 300 V and a phase inductance of 10 μH, powered via the superconductor current limiting device 10, the rotation frequency is 5000 revolutions/minute for an electrical frequency of 500 Hz. In these conditions, in the case of a short-circuit, the fault current would be established at an approximate value of 10,000 A. So, to limit the fault current to a value that is not too far away from the rated current, and by using a superconductor current limiting device as described, an inductance of 50 μH is necessary in this superconductor current limiting device. In the case of a superconductor busbar 140 of a few metres in length, comprising a superconductive material without stabilizing layer, the resistance of the superconductor busbar 140 can reach several ohms (here 2.5 ohms, according to the example described). Thus, the resistive component of the overall impedance of the superconductor current limiting device becomes approximately 17 times greater than the inductive component of the overall impedance and the losses through Joules effect are reduced in the presence of an electrical fault of short-circuit type.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft, comprising:

at least one electric motor powered using a cryogenic system, the cryogenic system including a superconductor current limiting device comprising:

a leak-tight enclosure having two apertures arranged on opposite sides of the leak-tight enclosure and arranged to allow a circulation of a cryogenic fluid inside said leak-tight enclosure, a superconductor busbar passing through said leak-tight enclosure via two connection apertures, having a central part arranged inside said leak-tight enclosure such that the central part is surrounded by the cryogenic fluid circulating in the leak-tight enclosure, and a first and a second terminal parts respectively arranged on either side of said central part and in continuity of said central part and at least partially arranged outside of said leak-tight enclosure, and an inductor comprising a first pole and a second pole arranged inside the leak-tight enclosure and disposed facing the central part of the superconductor busbar, wherein the first pole of the inductor is electrically connected to the first terminal part of the superconductor busbar via a first connection link, and the second pole of the inductor is electrically connected to the second terminal part of the superconductor busbar via a second connection link.

2. The aircraft according to claim 1, wherein said superconductor busbar further comprises superconductive strips without a stabilizing layer.

3. The aircraft according to claim 1, wherein said superconductor busbar comprises a ceramic superconductive material.

4. The aircraft according to claim 1, wherein the inductor comprises a fault current detection device, wherein the fault current detection device is configured to measure a current component which passes through the inductor.

5. The aircraft according to claim 1, wherein the central part of the superconductor busbar and the inductor are arranged in parallel within the leak-tight enclosure.

6. The aircraft according to claim 1, wherein the superconductor busbar is linear and extends through opposite sides of the leak-tight enclosure.

7. The aircraft according to claim 1, wherein the central part of the superconductor busbar is a resistive component.

* * * * *